(12) United States Patent
Baccouche et al.

(10) Patent No.: US 9,969,434 B2
(45) Date of Patent: May 15, 2018

(54) VEHICLE BODY B-PILLAR ASSEMBLY WITH CELL MEMBER

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 15/254,518

(22) Filed: Sep. 1, 2016

(65) Prior Publication Data
US 2018/0057067 A1 Mar. 1, 2018

(51) Int. Cl.
*B62D 25/04* (2006.01)
*B62D 27/02* (2006.01)

(52) U.S. Cl.
CPC ........... *B62D 25/04* (2013.01); *B62D 27/023* (2013.01)

(58) Field of Classification Search
CPC ....... B62D 25/02; B62D 25/04; B62D 27/023
USPC ............. 296/187.03, 187.12, 193.06, 203.03
See application file for complete search history.

(56) References Cited

U.S. PATENT DOCUMENTS

| 6,296,301 | B1 | 10/2001 | Schroeder et al. | |
| 7,677,645 | B2 | 3/2010 | Henkelmann | |
| 8,029,047 | B2 * | 10/2011 | Kim | B62D 25/04 296/187.12 |
| 8,491,047 | B1 * | 7/2013 | Moll | B62D 25/04 296/193.06 |
| 8,888,169 | B2 | 11/2014 | Howe et al. | |
| 8,905,464 | B2 | 12/2014 | Gunther et al. | |
| 9,079,616 | B2 | 7/2015 | Mildner et al. | |
| 2011/0133515 | A1 * | 6/2011 | Mori | B62D 21/157 296/193.06 |
| 2012/0313400 | A1 * | 12/2012 | Balzer | B62D 25/04 296/193.06 |

FOREIGN PATENT DOCUMENTS

EP 2383170 A1 11/2011

* cited by examiner

*Primary Examiner* — Jason S Daniels
(74) *Attorney, Agent, or Firm* — Jason C. Rogers; Brooks Kushman P.C.

(57) ABSTRACT

A vehicle B-pillar assembly is provided. The vehicle B-pillar assembly includes a T-bracket, a B-pillar inner, a B-pillar reinforcement, a cell member, and a B-pillar outer. The T-bracket is mounted to a roof rail. The B-pillar inner is mounted to the T-bracket. The B-pillar reinforcement is mounted to the B-pillar inner and defines a cavity. The cell member is sized for insertion within the cavity and for securing therein. The cell member is oriented with the T-bracket for partially absorbing a load from a side impact to the B-pillar assembly. The B-pillar outer spans between the roof rail and a rocker panel. The cell member may extend within the cavity between a location above a vehicle beltline and a location below the vehicle beltline.

17 Claims, 6 Drawing Sheets

VEHICLE BODY B-PILLAR ASSEMBLY WITH CELL MEMBER

TECHNICAL FIELD

This disclosure relates to structural reinforcement components for B-pillar assemblies of vehicles.

BACKGROUND

B-pillar assemblies of automotive vehicles are tested for performance under impacts such as a side impact test and a roof crush test. The B-pillar assemblies may have various components made of various materials. For example, the components may be of steel or carbon fiber. Carbon fiber components typically weigh less than steel components and as such may provide for improved vehicle fuel economy. Difficulties may arise when carbon fiber is used for components which are typically made of steel. A lack of ductility in the carbon fiber components may prevent desired deformation performance of the B-pillar assembly during the side impact test or roof crush test.

This disclosure is directed to solving the above problems and other problems as summarized below.

SUMMARY

According to an aspect of the present disclosure, a vehicle B-pillar assembly includes a T-bracket, a B-pillar inner, a B-pillar reinforcement, a cell member, and a B-pillar outer. The T-bracket is mounted to a roof rail. The B-pillar inner is mounted to the T-bracket. The B-pillar reinforcement is mounted to the B-pillar inner and defines a cavity. The cell member is sized for insertion within the cavity and for securing therein. The cell member is oriented with the T-bracket for partially absorbing a load from a side impact to the B-pillar assembly. The B-pillar outer spans between the roof rail and a rocker panel. The cell member may extend within the cavity between a location above a vehicle beltline and a location below the vehicle beltline. The vehicle beltline may be defined as location extending fore to aft along a vehicle body between a shotgun joint on an A-pillar and a door latch reinforcement on a C-pillar. The cell member may define a bowed portion adjacent a vehicle beltline shaped to match a corresponding portion of the B-pillar reinforcement. The bowed portion may be located at a zero stress zone in which compression and tension forces from a side impact substantially cancel one another. The cell member may extend within the B-pillar reinforcement between a location above the zero stress zone and a location below the zero stress zone. The cell member may include two or more nodes.

According to another aspect of the present disclosure, a vehicle B-pillar assembly includes a T-bracket, a B-pillar inner, a B-pillar reinforcement, and a B-pillar outer. The T-bracket includes an upper portion mounted to a vehicle roof rail and a lower portion. The B-pillar inner is mounted to the T-bracket. The B-pillar reinforcement includes a carbon fiber cell member disposed within a cavity defined by the B-pillar reinforcement. The B-pillar outer is mounted to the T-bracket and a vehicle rocker panel. The carbon fiber cell member is oriented relative to the vehicle roof rail and the vehicle rocker panel such that the carbon fiber cell member deforms to absorb a portion of a load applied in a side impact to the B-pillar assembly. The carbon fiber cell member may define a bowed portion at a lower portion of the carbon fiber cell member. The bowed portion may be located adjacent to a vehicle beltline. The carbon fiber cell member may extend between a location above a vehicle beltline and a location below the vehicle beltline. The vehicle beltline may extend fore and aft along a vehicle body and through a central region of the B-pillar assembly. The vehicle beltline may be defined by an axis extending between a shotgun joint on a vehicle A-pillar and a latch reinforcement on a vehicle C-pillar. The cell member may include two or more nodes.

According to a further aspect of the present disclosure, a vehicle body includes a roof rail, a rocker panel, and a B-pillar assembly. The B-pillar assembly spans between the roof rail and rocker panel. The B-pillar assembly includes a T-bracket, a B-pillar inner, a B-pillar reinforcement defining a cavity, a cell member disposed within the cavity, and a B-pillar outer. The cell member is located at a zero stress region of the B-pillar assembly in which compression and torsional forces from a side impact substantially cancel one another. The cell member may be oriented relative to the B-pillar outer such that stiffness is provided to the B-pillar assembly when the B-pillar outer cracks under a load from a side impact. The cell member may define a bowed portion adjacent a vehicle beltline. The vehicle beltline may be defined by an axis extending fore and aft along the vehicle body between a shotgun joint on a vehicle A-pillar and a door latch reinforcement on a vehicle C-pillar. The cell member may include two or more nodes. The cell member may extend between a location above a vehicle beltline and a location below the vehicle beltline.

DETAILED DESCRIPTION

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
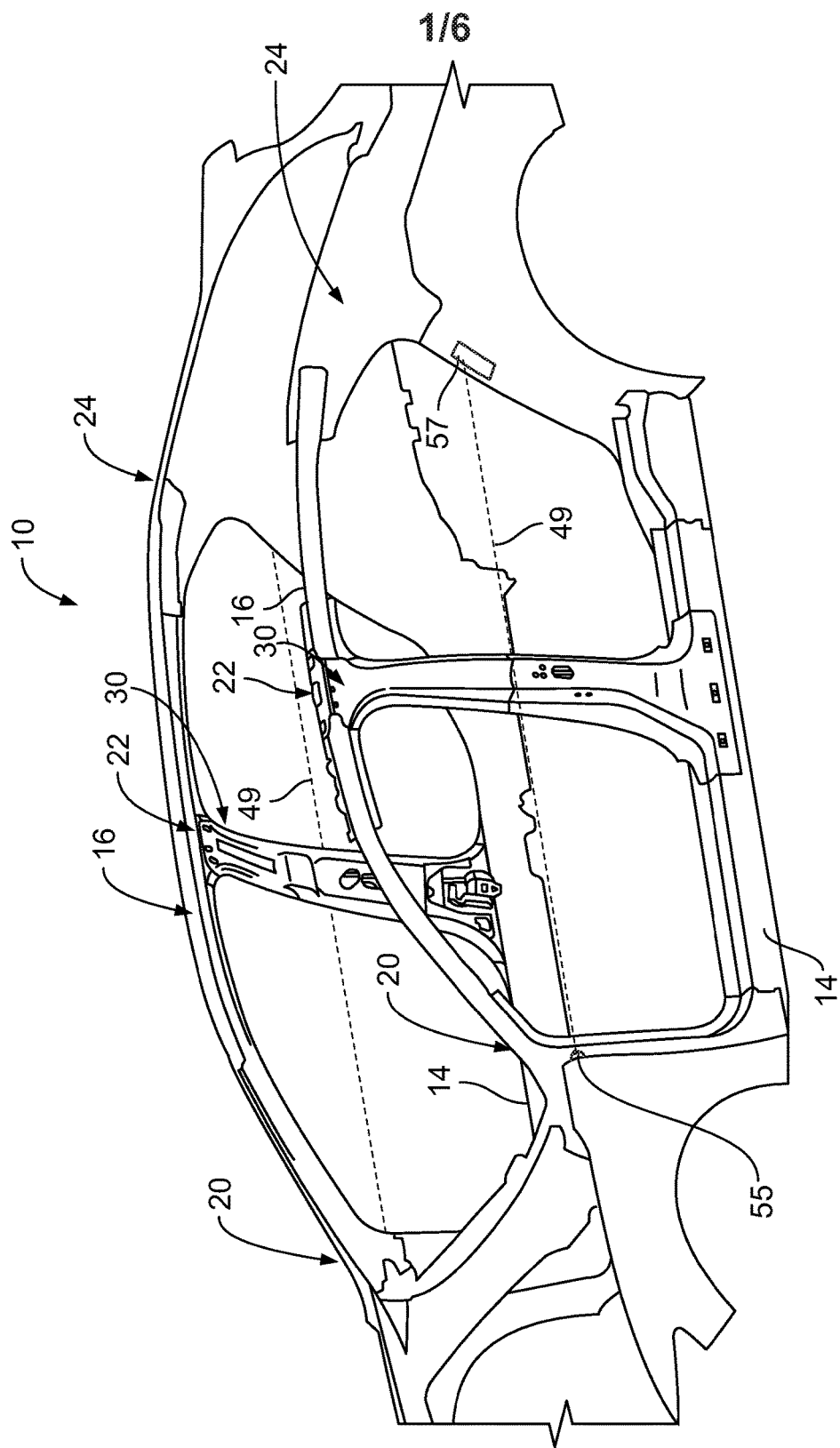
FIG. 1 is a fragmentary perspective view of an example of a vehicle body.

FIG. 1 illustrates an example of a portion of a vehicle body referred to generally as a vehicle body 10 herein. The vehicle body 10 includes rocker panels 14 spaced from roof rails 16. Pillars extend between the rocker panels 14 and the roof rails 16. For example, the vehicle body 10 includes A-pillars 20, B-pillars 22, and C-pillars 24. The A-pillars 20 are spaced from one another and partially define an opening for a front windshield. The A-pillars 20, the B-pillars 22, the rocker panels 14, and the roof rails 16 define an opening for a front door. The B-pillars 22, the C-pillars 24, the rocker panels 14, and the roof rails 16 define an opening for a rear door.

Figure 4:
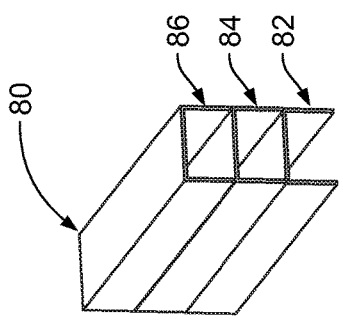
FIG. 4 is a perspective view of an example of a three cell insert for strengthening the B-pillar assembly of FIG. 2.
Figure 3:
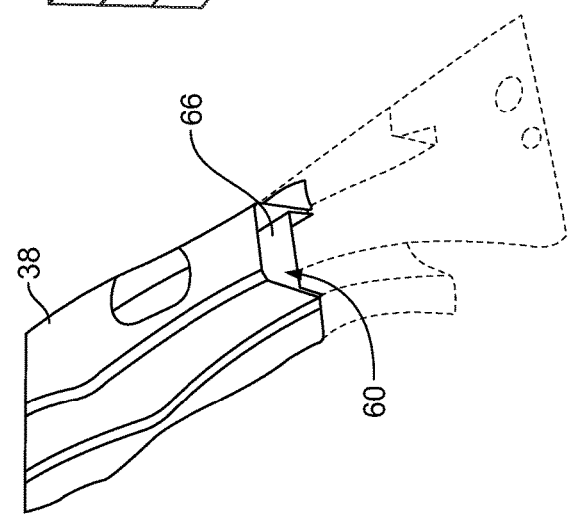
FIG. 3 is a fragmentary perspective view of an example of an inner reinforcement of the B-pillar assembly of FIG. 2.
Figure 2:
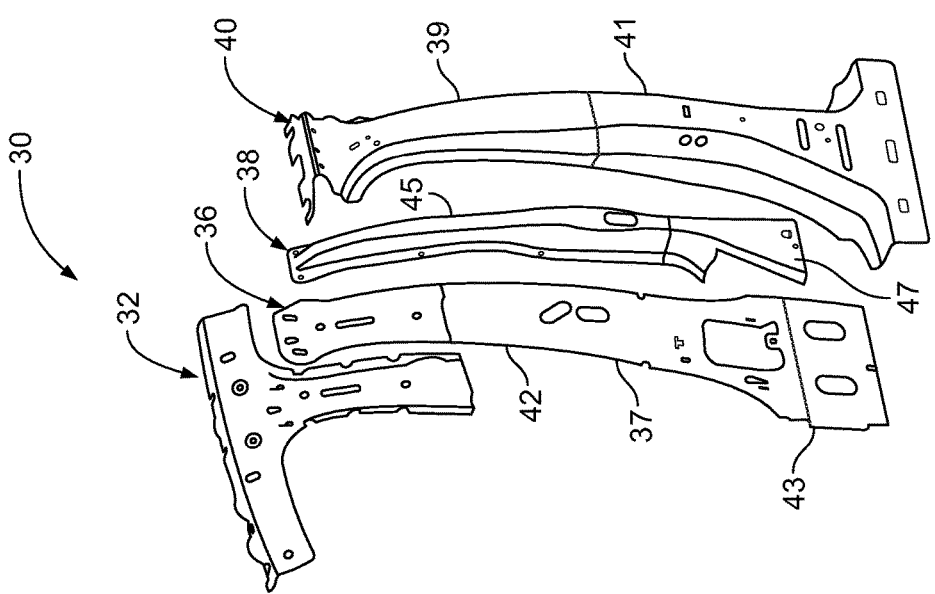
FIG. 2 is an exploded view of a pillar assembly of the vehicle body of FIG. 1.

FIGS. 2 through 4 illustrate an example of components of a B-pillar assembly. Two B-pillar assemblies 30 are mounted to the vehicle body 10 at the B-pillars 22. Each of the B-pillar assemblies 30 includes a T-bracket 32, a B-pillar inner 36, a B-pillar reinforcement 38, and a B-pillar outer 40. The T-bracket 32 may be made of a material including high ductility characteristics, such as boron steel. The B-pillar inner 36 and the B-pillar reinforcement 38 may be made of a material including low ductility characteristics, such as carbon fiber. The B-pillar outer 40 may be made of a carbon fiber component 39 and a steel component 41. The B-pillar inner 36 includes an upper end 42 for securing to the T-bracket 32, a lower end 43 for securing to the rocker panel 14, and a middle portion 37. The upper end 42 and the middle portion 37 meet at a location adjacent a vehicle beltline 49. The upper end 42 and the lower end 43 may define a first thickness and the middle portion 37 may define a second thickness greater than the first thickness. For example, the upper end 42 and the lower end 43 may define a thickness between 3.7 mm and 4.1 mm and the middle portion 37 may define a thickness between 5.0 mm and 5.4 mm.

The beltline 49 of the vehicle body 10 may be defined as a location extending fore to aft along the vehicle body 10 located midway between the rocker panels 14 and the roof rails 16, or midway between an upper end and a lower end of the B-pillar outer 40. For example, the beltline 49 may extend between a hinge pillar at a shotgun joint 55 on the A-pillar 20 and a door latch reinforcement 57 on the C-pillar 24. The beltline 49 of the vehicle body 10 may extend along a location of an upper edge of a window opening of a front or rear door (not shown).

The B-pillar reinforcement 38 includes an upper end 45 and a lower end 47. The upper end 45 defines a third thickness and the lower end 47 defines a fourth thickness. For example, the upper end 45 of the B-pillar reinforcement 38 may define a thickness between 3.7 mm and 4.1 mm and the lower end 47 of the B-pillar reinforcement 38 may define a thickness between 2.4 mm and 2.8 mm. The B-pillar reinforcement 38 may define a substantially u-shaped profile adapted to be inserted within a corresponding shape of the B-pillar outer 40.

In previous examples of B-pillar assemblies, strength and rigidity issues may have arisen when subjected to a side impact. A B-pillar reinforcement of the assembly, such as the B-pillar reinforcement 38, may define space within the component to provide for insertion of one or more cell members to absorb stress received when subjected to a load from an impact.

For example, FIG. 3 provides a detailed view of the B-pillar reinforcement 38 in which portions are removed to illustrate a cavity 60 defined thereby. A size of the cavity 60 is sufficient for insertion of one or more cell members, such as cell member 66. The cell member 66 is a reinforcement component to assist in increasing strength of the B-pillar assembly 30. Cell member 66 may define a U-shaped profile at portions thereof to match a profile of the reinforcement member 38. The cell member 66 may extend along the B-pillar between a location above and a location below the beltline 49 (best shown in FIG. 8). For example, the cell member 66 may be located at a zero stress zone 67 of the B-pillar assembly 30 in which a net stress from a side impact is minimal or substantially zero. A zero stress zone 67 (shown in FIGS. 7 and 8) in which stress is minimal or substantially zero is a region in between or at a location of the B-pillar assembly where compression forces and tension forces resulting from the side impact meet to substantially cancel one another. The cell member 66 assists in increasing a rigidity of the B-pillar assembly 30 when receiving a load from a side impact. The cell member 66 may have a thickness based on a material of the cell member 66 and/or a weight of the vehicle body 10. The thickness may also be based on a type of manufacturing process used to create the cell member 66.

It is contemplated that the cell member 66 may include multiple cells. For example, FIG. 4 shows an example of a three cell member, referred to generally as a three cell member 80 herein. The three cell member 80 may define a first node 82, a second node 84, and a third node 86. The nodes may be sized according to space available and defined by the respective B-pillar reinforcement, such as the B-pillar reinforcement 38.

Figure 6:
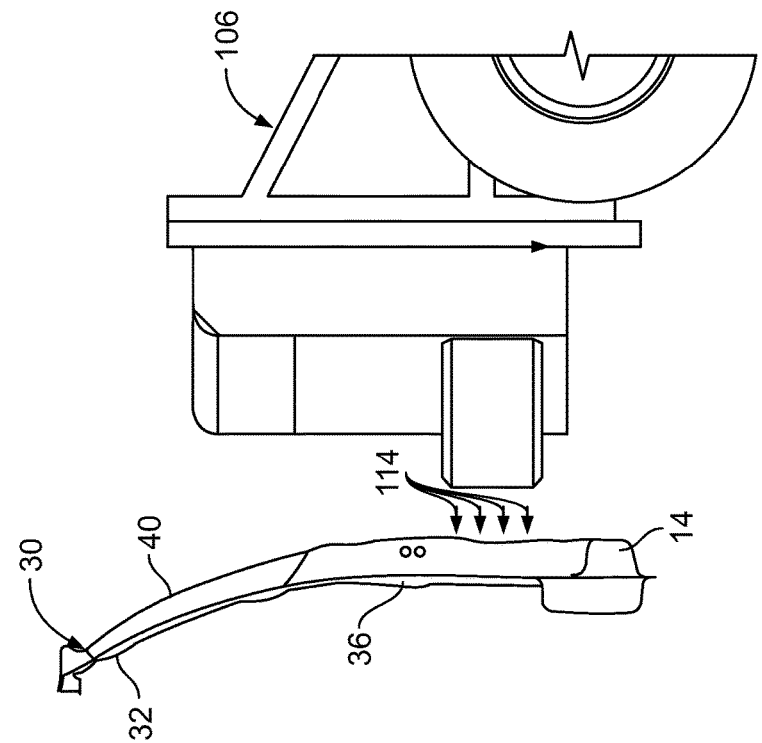
FIG. 6 is a side view of FIG. 5.
Figure 5:
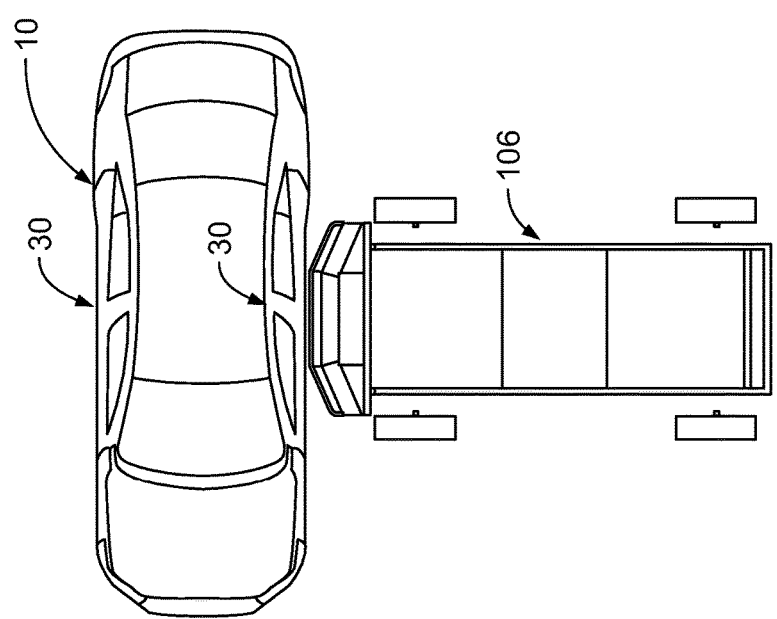
FIG. 5 is a top view of an example of a setup for a side impact crash test including an impact sled and vehicle.

FIG. 5 is a top view illustrating a portion of an Insurance Institute for Highway Safety (IIHS) side impact crash test and shows the vehicle body 10 with a test sled 106. FIG. 6 is a front view illustrating a portion of the side impact test. In this example, the test sled 106 is propelled toward the vehicle body 10. The test sled 106 and the vehicle body 10 are arranged with one another such that the test sled contacts the vehicle body 10 at the B-pillar assembly 107 above the rocker panel 14 as represented by force arrows 114. As mentioned above, each B-pillar assembly 30 includes the B-pillar outer 40, the T-bracket 32, the B-pillar inner 36, and the cell member 66 housed within the cavity 60 defined by the B-pillar reinforcement 38 (not visible in FIG. 6).

Figure 7:
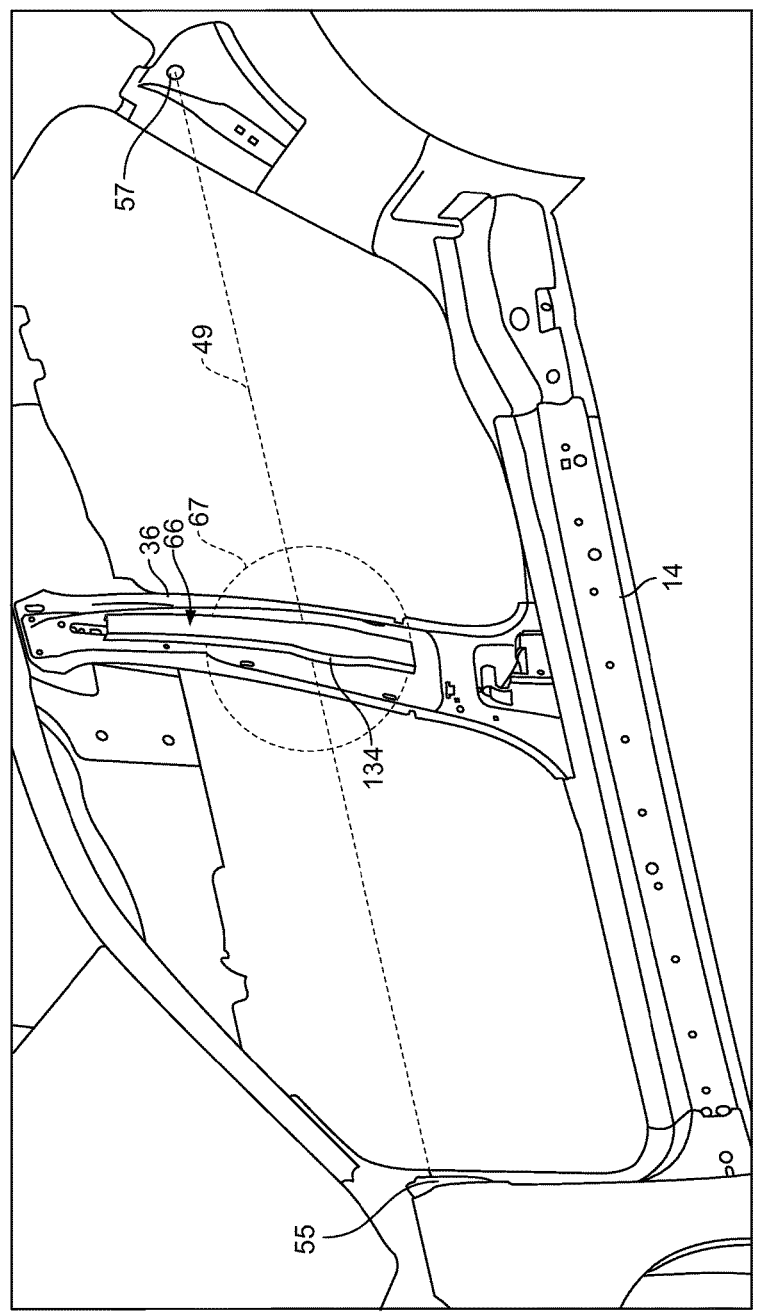
FIG. 7 is a fragmentary perspective view of a portion of the B-pillar assembly of FIG. 2.
Figure 8:
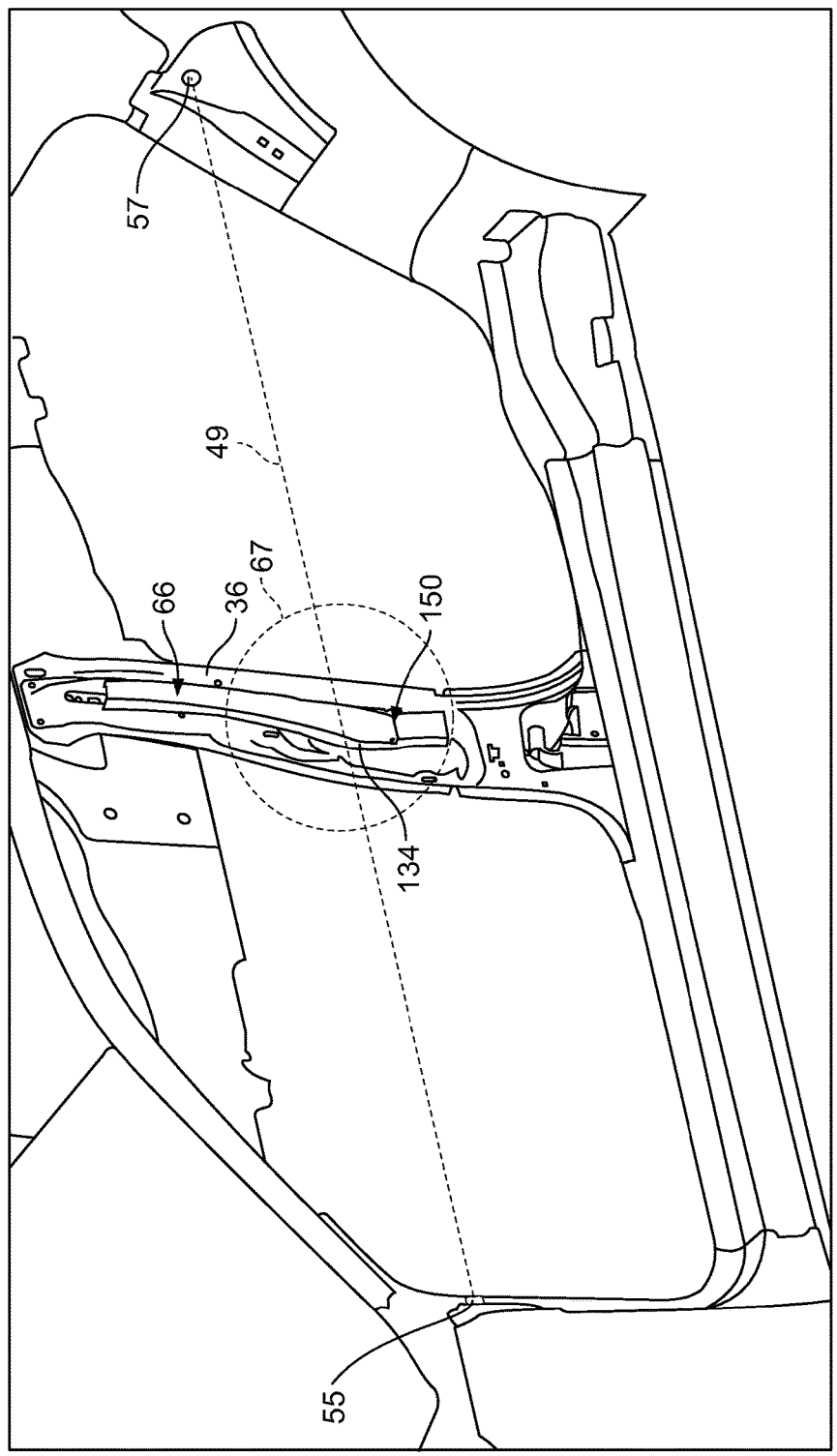
FIG. 8 is a fragmentary perspective view of a portion of the B-pillar assembly of FIG. 2 after a side impact.

FIGS. 7 and 8 are perspective views of a portion of the vehicle body 100 and the B-pillar assemblies 107 with components removed to provide visibility to the cell member 66. FIG. 7 shows the cell member 66 prior to a side impact to the B-pillar assembly 30 and FIG. 8 shows the cell member 66 following a side impact to the B-pillar assembly 30. The cell member 66 may define a bowed portion 134. The bowed portion 134 may be shaped to sit within the B-pillar reinforcement 38 and may be located adjacent the vehicle beltline 49. As shown in FIG. 8, an orientation of the cell member 66 relative to the rocker panel 14 and the roof rail 16 provides additional rigidity to the B-pillar assembly 30 such that a fracture 150 occurs below the vehicle beltline 49 when the B-pillar assembly 30 is subjected to a side impact.

Figure 9:
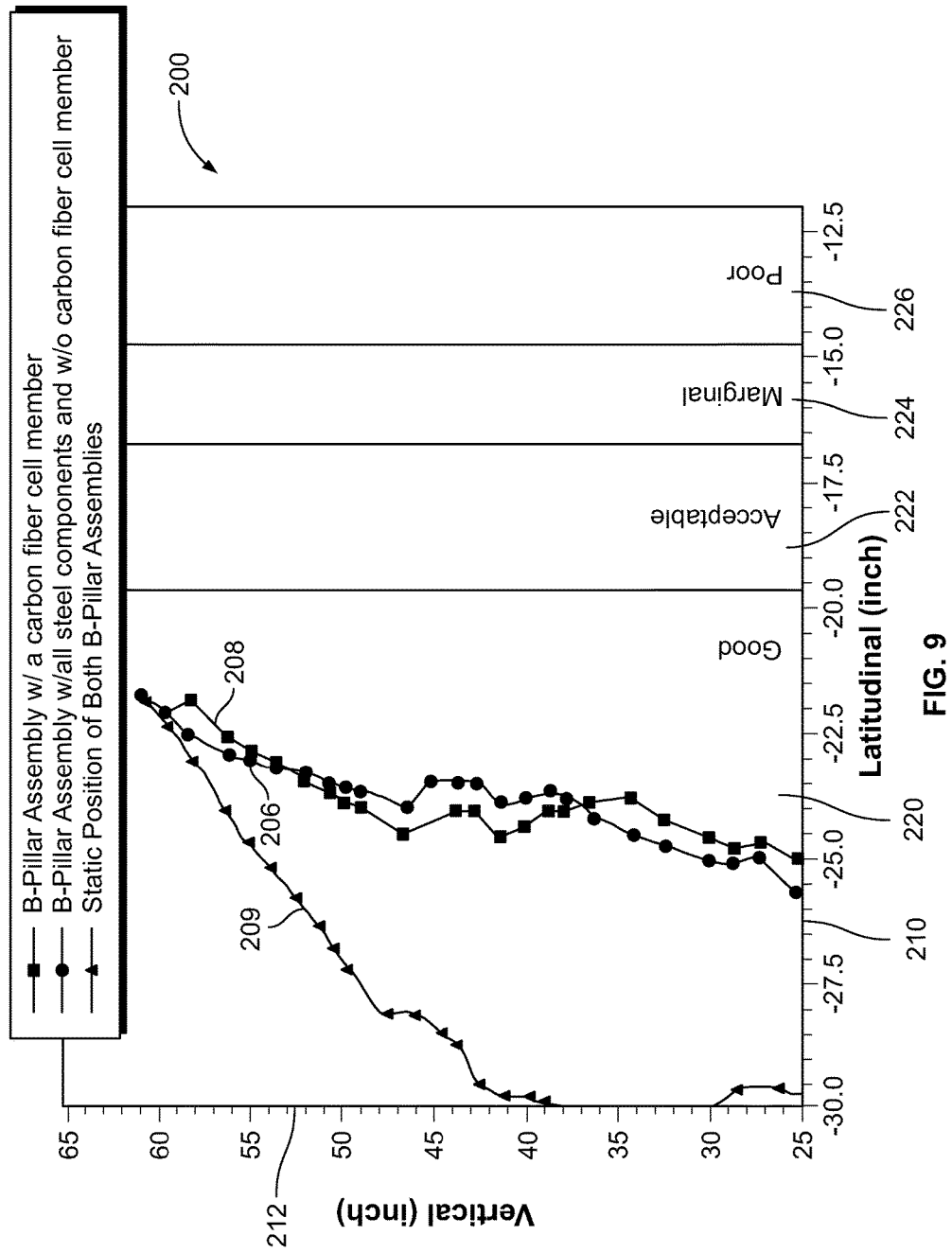
FIG. 9 is a graph illustrating a performance comparison of two B-pillar assemblies subjected to a side impact test.

FIG. 9 is a graph comparing two B-pillar assemblies during a model of the IIHS side impact test, referred to generally as a graph 200 herein. A first plot 206 represents a performance of a B-pillar assembly without a cell member. A second plot 208 represents a performance of a B-pillar assembly including a carbon fiber cell member reinforcement, such as the cell members 66, and steel and carbon fiber components. A third plot 209 represents a static position of both B-pillar assemblies prior to the side impact. X-axis 210 represents a horizontal displacement of the respective B-pillar assembly relative to the static position represented with plot 209. Y-axis 212 represents a vertical displacement of the B-pillar assemblies relative to the static position represented with plot 209. The plots illustrate a structural performance of the two B-pillar assemblies subjected to a side impact by measuring an extent of intrusion into a vehicle cabin proximate the B-pillar.

The graph 200 includes multiple regions for rating the displacement. For example, the graph 200 includes a good region 220, an acceptable region 222, a marginal region 224, and a poor region 226. A plot located in the good region 220 represents performance of a B-pillar assembly in which a driver is seventy percent less likely to be impacted from a side impact in comparison to a plot located in the poor region 226. A plot located in the acceptable region 222 is sixty-four percent less likely to be impacted in comparison to the poor region 226 and a plot in the marginal region 224 is forty-nine percent less likely to impacted in comparison to the poor region 226.

In this example, the first plot 206 and the second plot 208 are substantially similar in both the vertical and horizontal displacements. Plot 208 supports a finding that the B-pillar assembly with the carbon fiber cell member and steel and carbon fiber components has substantially similar displacement characteristics to the B-pillar assembly without a cell member and including all steel components. The carbon fiber cell member within a B-pillar reinforcement provides weight reductions while providing acceptable deformation characteristics when subjected to a side impact.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle B-pillar assembly comprising:
   a T-bracket mounted to a roof rail;
   a B-pillar inner mounted to the T-bracket;
   a B-pillar reinforcement mounted to the B-pillar inner and defining a cavity;
   a cell member sized for insertion within the cavity and for securing therein, oriented with the T-bracket for partially absorbing a load from a side impact to the B-pillar assembly, and defining a bowed portion adjacent a vehicle beltline shaped to match a corresponding portion of the B-pillar reinforcement; and
   a B-pillar outer spanning between the roof rail and a rocker panel,
   wherein the bowed portion is located at a zero-stress zone in which compression and tension forces from a side impact substantially cancel one another.

2. The assembly of claim 1, wherein the cell member extends within the cavity between a location above a vehicle beltline and a location below the vehicle beltline.

3. The assembly of claim 2, wherein the vehicle beltline is defined as a location extending fore to aft along a vehicle body between a shotgun joint on an A-pillar and a door latch reinforcement on a C-pillar.

4. The assembly of claim 1, wherein the cell member extends within the B-pillar reinforcement between a location above the zero-stress zone and a location below the zero-stress zone.

5. The assembly of claim 1, wherein cell member includes two or more nodes.

6. A vehicle B-pillar assembly comprising:
   a T-bracket including an upper portion mounted to a vehicle roof rail and a lower portion;
   a B-pillar inner mounted to the T-bracket;
   a B-pillar reinforcement including a carbon fiber cell member disposed within a cavity defined by the B-pillar reinforcement and defining a bowed portion at a lower portion of the carbon fiber cell member at a zero-stress zone in which compression and tension forces from a side impact substantially cancel one another; and
   a B-pillar outer mounted to the T-bracket and a vehicle rocker panel,
   wherein the carbon fiber cell member is oriented relative to the vehicle roof rail and the vehicle rocker panel such that the carbon fiber cell member deforms to absorb a portion of a load applied in a side impact to the B-pillar assembly, and wherein the carbon fiber cell member extends within the B-pillar reinforcement between a location above the zero-stress zone and a location below the zero-stress zone.

7. The assembly of claim 6, wherein the bowed portion is located adjacent to a vehicle beltline.

8. The assembly of claim 6, wherein the carbon fiber cell member extends between a location above a vehicle beltline and a location below the vehicle beltline.

9. The assembly of claim 8, wherein the vehicle beltline extends fore and aft along a vehicle body and through a central region of the B-pillar assembly.

10. The assembly of claim 8, wherein the vehicle beltline is defined by an axis extending between a shotgun joint on a vehicle A-pillar and a latch reinforcement on a vehicle C-pillar.

11. The assembly of claim 6, wherein the cell member includes two or more nodes.

12. A vehicle body comprising:
   a roof rail;
   a rocker panel; and
   a B-pillar assembly spanning between the roof rail and rocker panel and including
      a T-bracket,
      a B-pillar inner,
      a B-pillar reinforcement defining a cavity,
      a cell member disposed within the cavity, and
      a B-pillar outer,
   wherein the cell member is located at a zero-stress region of the B-pillar assembly in which tension and compression forces from a side impact substantially cancel one another.

13. The vehicle body of claim 12, wherein the cell member is oriented relative to the B-pillar outer such that stiffness is provided to the B-pillar assembly when the B-pillar outer cracks under a load from a side impact.

14. The vehicle body of claim 12, wherein the cell member defines a bowed portion adjacent a vehicle beltline.

15. The vehicle body of claim 14, wherein the vehicle beltline is defined by an axis extending fore and aft along the vehicle body between a shotgun joint on a vehicle A-pillar and a door latch reinforcement on a vehicle C-pillar.

16. The vehicle body of claim 12, wherein the cell member includes two or more nodes.

17. The vehicle body of claim 12, wherein the cell member extends between a location above a vehicle beltline and a location below the vehicle beltline.

\* \* \* \* \*